(12) United States Patent
Okamoto et al.

(10) Patent No.: US 6,336,028 B1
(45) Date of Patent: Jan. 1, 2002

(54) SOFTWARE FUNCTION ADDING METHOD

(75) Inventors: Ryuichi Okamoto; Hideki Matsushima, both of Studio City; Masayuki Kozuka, Arcadia, all of CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/649,029

(22) Filed: Aug. 28, 2000

(51) Int. Cl.$^7$ .................................................. G09B 5/04
(52) U.S. Cl. ..................... 434/319; 434/118; 434/365; 84/462; 369/47.12
(58) Field of Search ..................... 434/118, 307 R–308, 434/318, 319, 365; 84/3, 461, 462; 348/14.01, 14.02, 170, 552, 561, 565; 345/723, 810; 369/47.12; 380/251; 386/46, 68, 83, 99, 109; 705/26, 27; 710/68; 713/181; 725/5, 8, 14, 28–30, 35, 45, 46, 62

(56) References Cited

U.S. PATENT DOCUMENTS

| | | | | |
|---|---|---|---|---|
| 5,579,239 A | * | 11/1996 | Freeman et al. | 348/14.01 |
| 5,610,653 A | * | 3/1997 | Abecassis | 348/170 |
| 5,684,918 A | * | 11/1997 | Abecassis | 348/14.01 |
| 5,835,087 A | * | 11/1998 | Herz et al. | 345/810 |
| 5,899,980 A | * | 5/1999 | Wilf et al. | 705/26 |
| 5,953,485 A | * | 9/1999 | Abecassis | 386/68 |
| 5,970,143 A | * | 10/1999 | Schneier et al. | 713/181 |
| 6,222,807 B1 | * | 4/2001 | Min-Jae | 369/47.12 |
| 6,243,772 B1 | * | 6/2001 | Ghori et al. | 710/68 |

* cited by examiner

Primary Examiner—Joe H. Cheng
(74) Attorney, Agent, or Firm—Wenderoth, Lind & Ponack, L.L.P.

(57) ABSTRACT

An object of the present invention is to provide a system in which it is possible to pre-warn the consumer who is trying to purchase contents that cannot be written on the PD that the contents cannot be written on the PD. Based on the PD writability information, the PD writability detector determines whether the contents distributed by the distribution system notified by the distribution system detector can be written on the PD. If it is determined that the contents cannot be written, the PD writability detector requests the controller to warn the consumer.

7 Claims, 11 Drawing Sheets

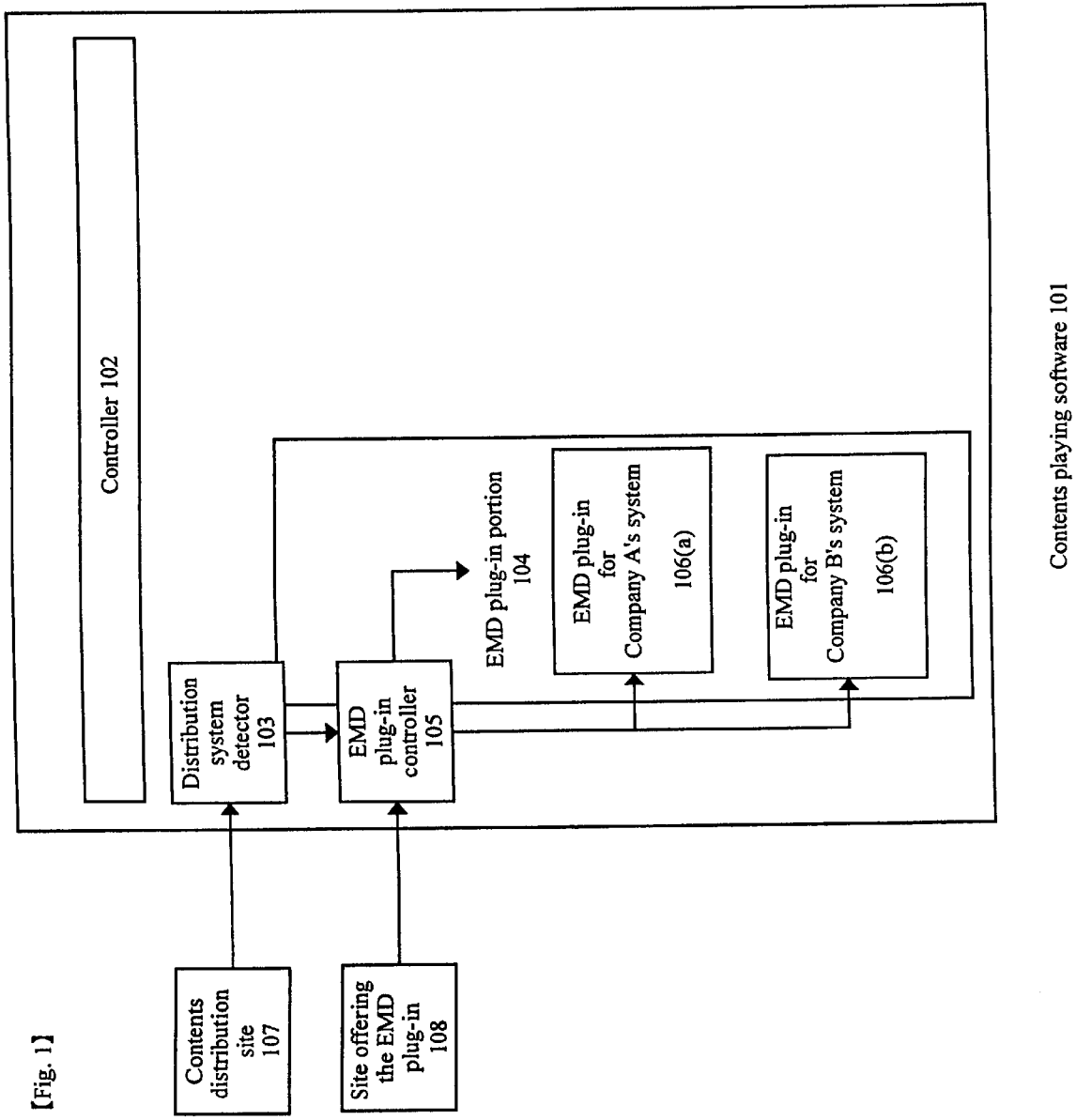
[Fig. 1]

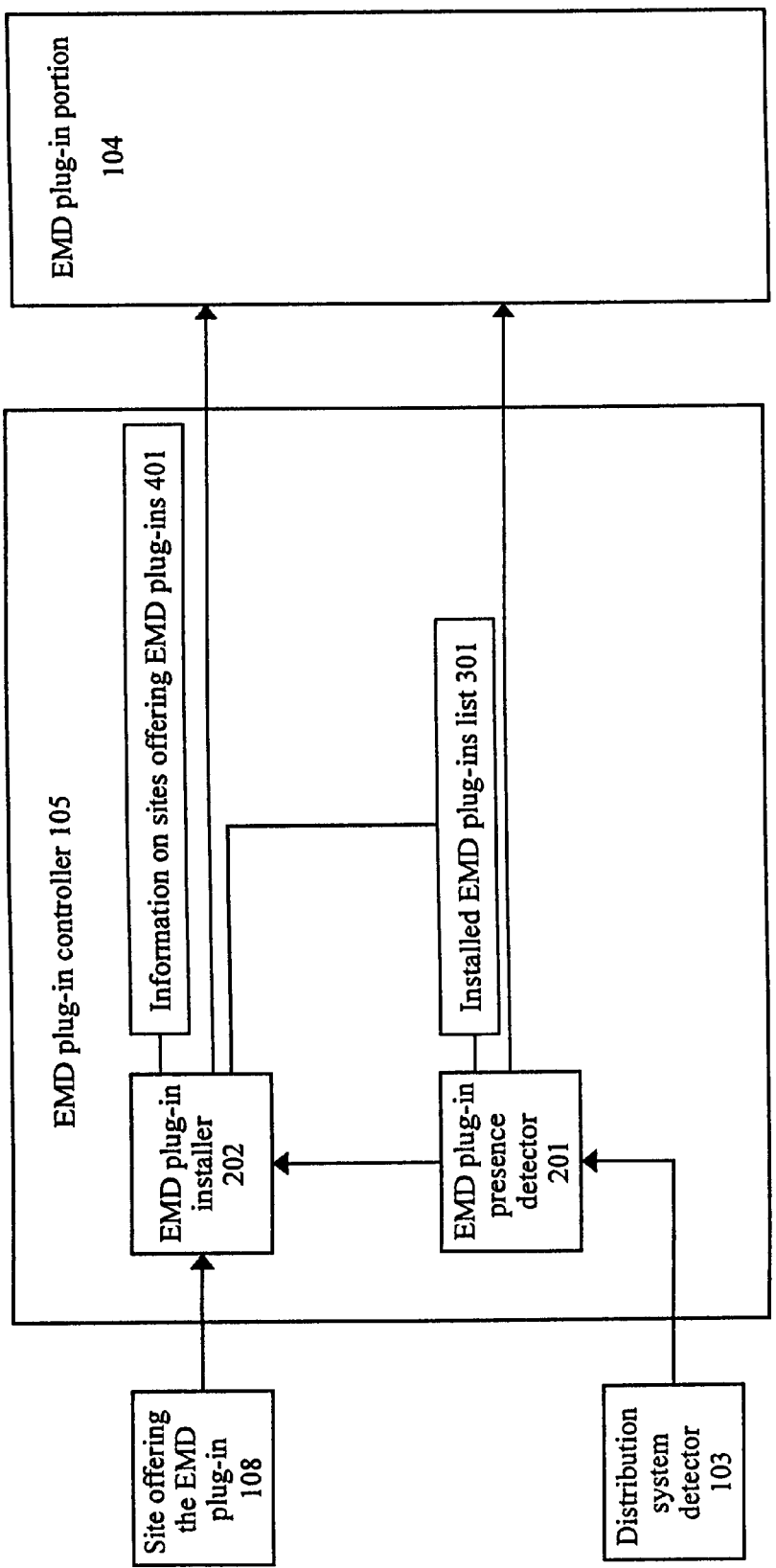
[Fig. 2]

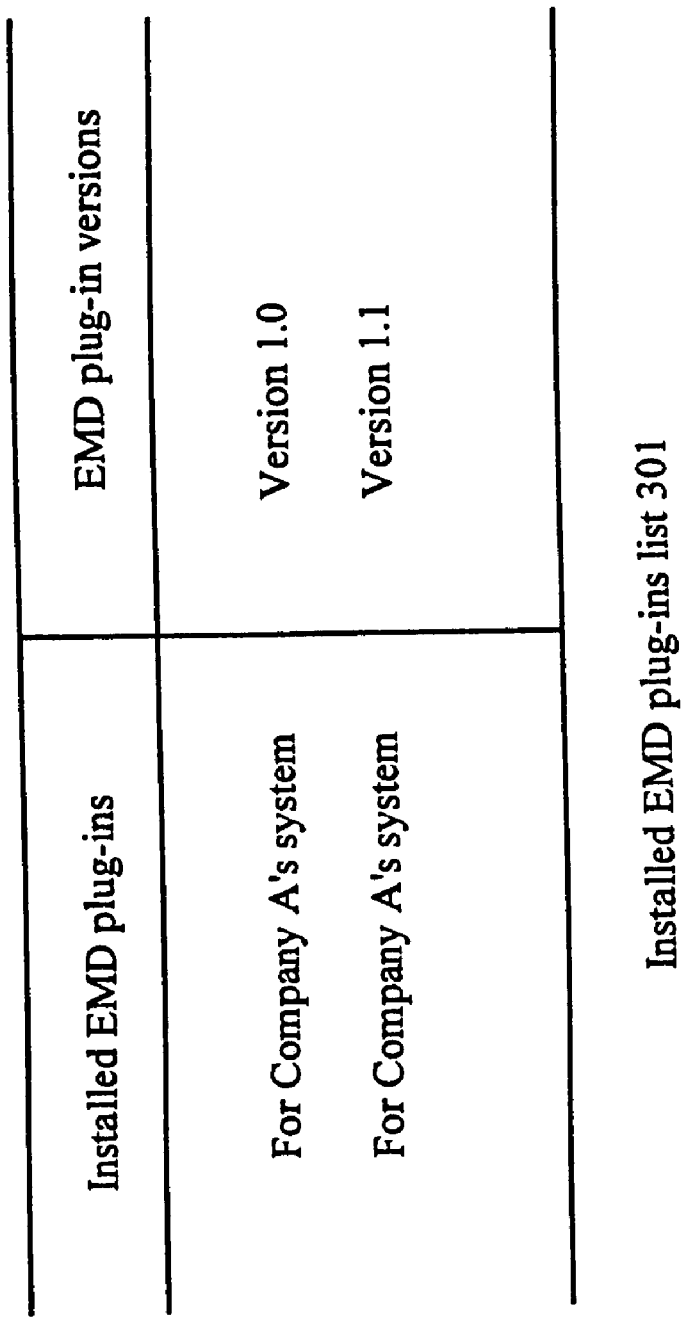
[Fig. 3]

[Fig. 4]

Version Number: 0002

| Distribution systems | Sites offering the EMD plug-in | EMD plug-in versions |
|---|---|---|
| Company A's system | http://www.EMD.com/EMD_A | Version 1.0 |
| Company B's system | http://www.EMD.com/EMD_B | Version 1.1 |
| Company C's system | http://www.EMD.com/EMD_C | Version 1.1 |
| Company D's system | http://www.EMD.com/EMD_D | Version 3.1 |
| Company E's system | http://www.EMD.com/EMD_E | Version 1.0 |
| Company F's system | http://www.EMD.com/EMD_F | Version 2.0 |

Information on sites offering EMD plug-ins 401

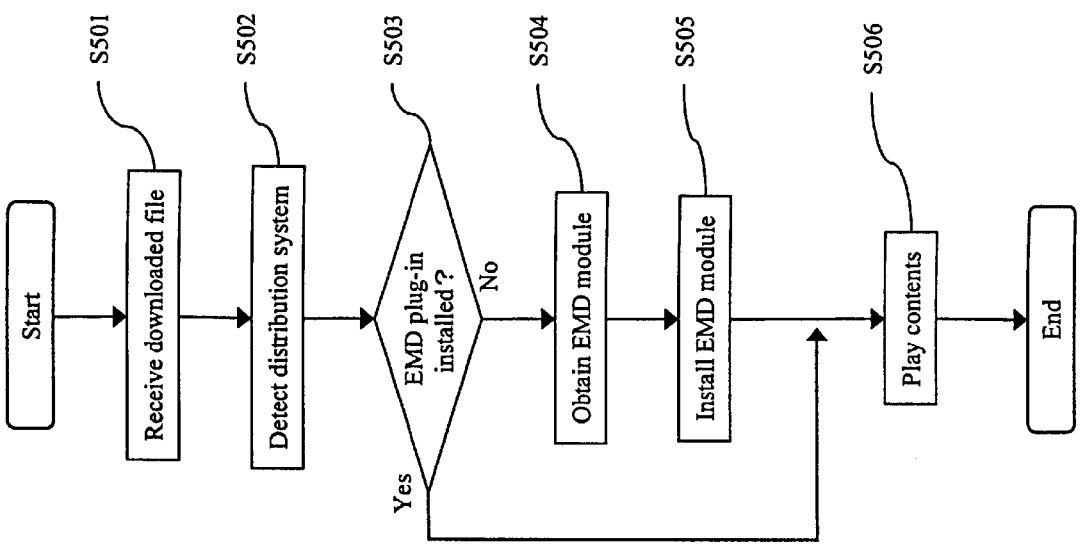
[Fig. 5]

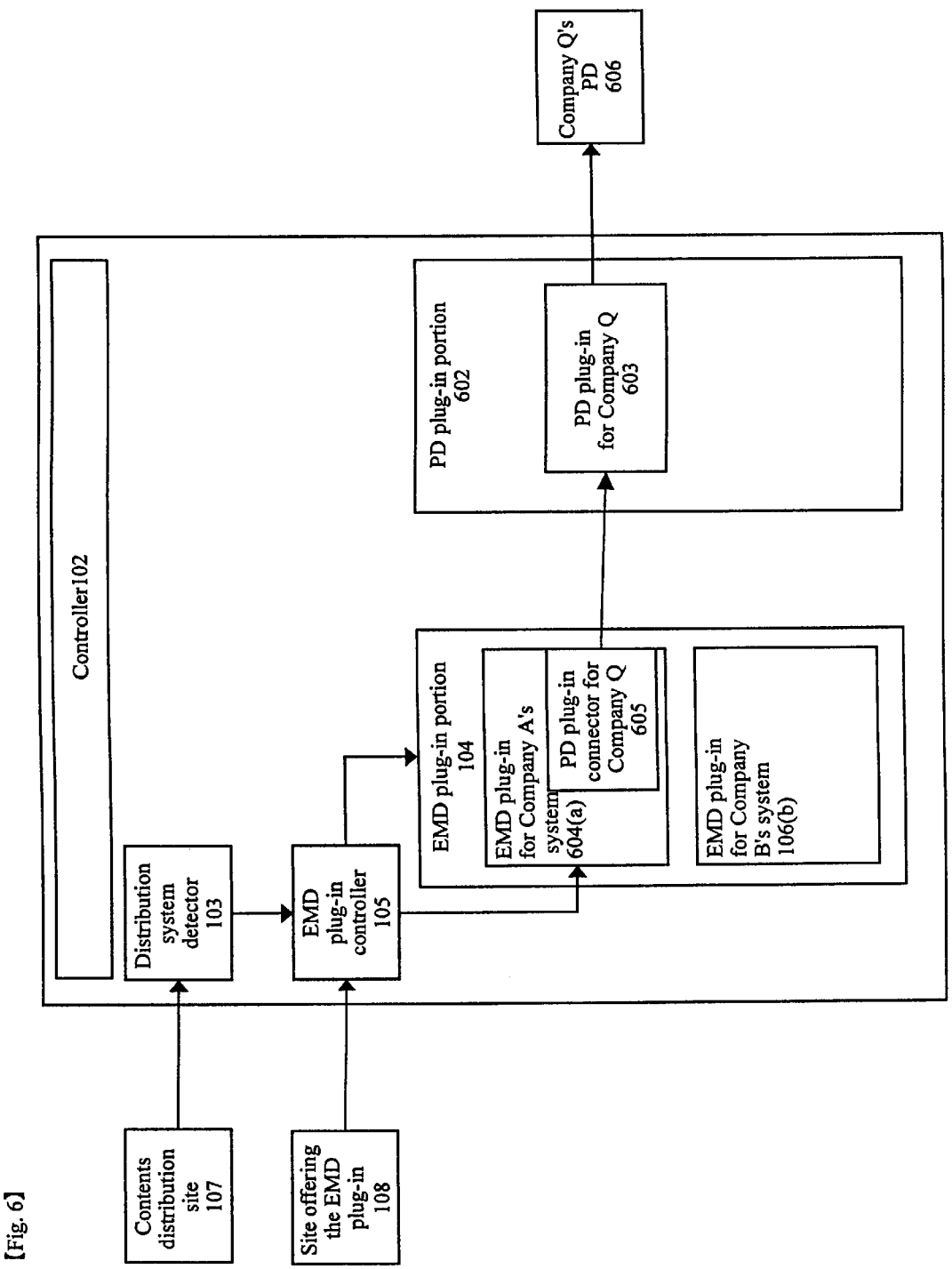

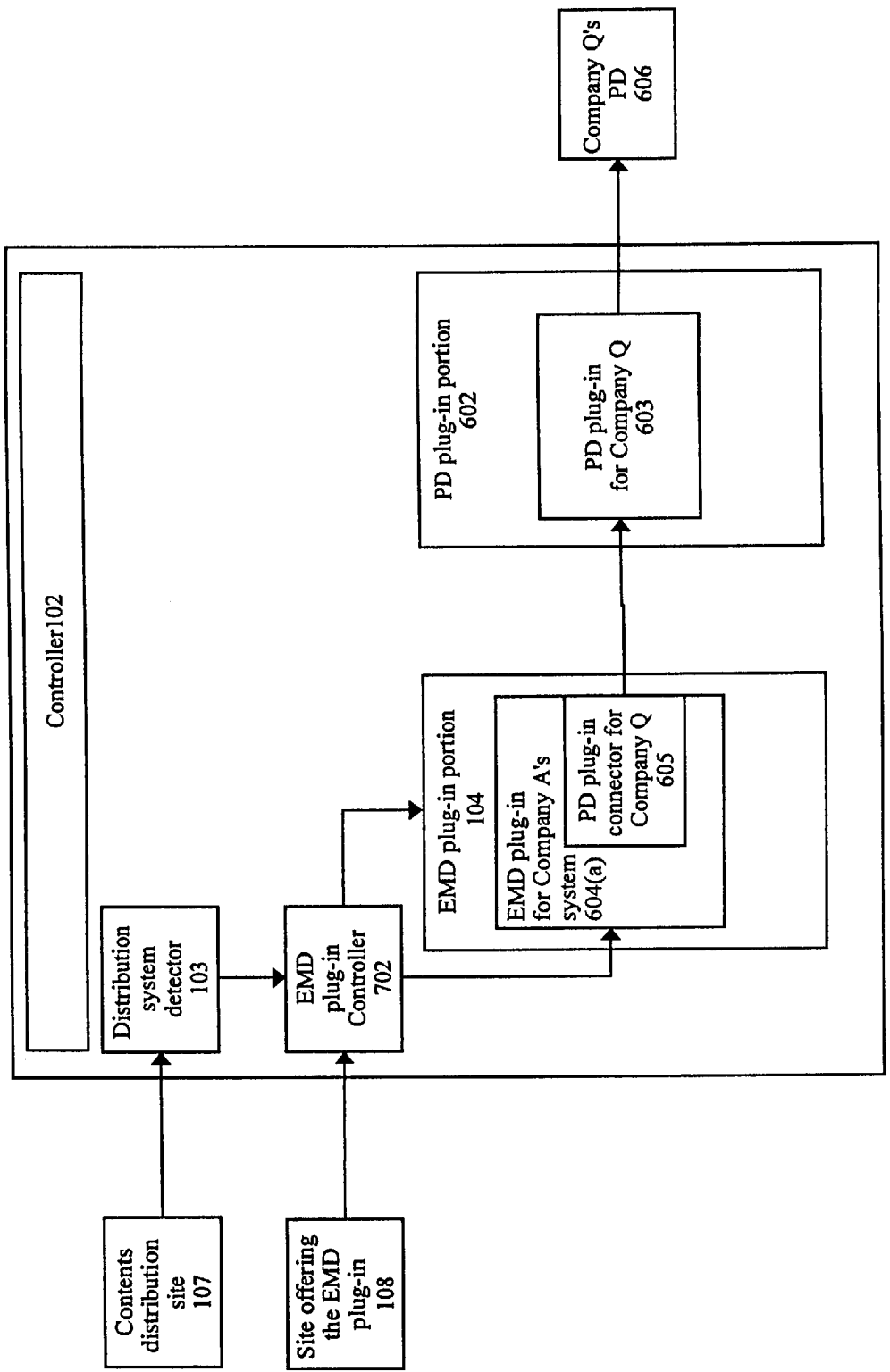

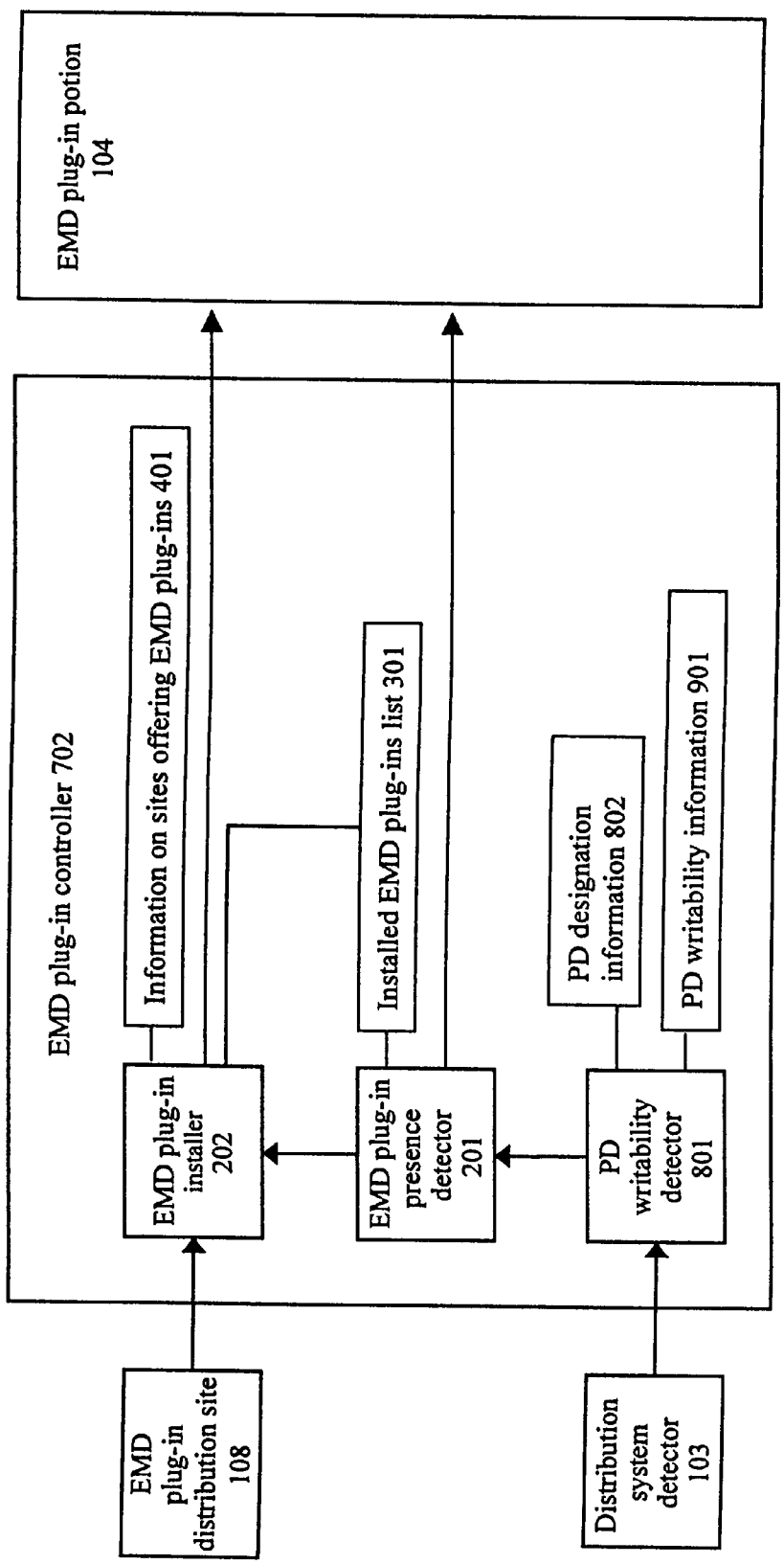
[Fig. 8]

[Fig. 9]

| Version number: 0004 | |
|---|---|
| Distribution systems | Writability |
| Company A's system | Yes |
| Company B's system | Yes |
| Company C's system | No |
| Company D's system | No |
| Company E's system | Yes |
| Company F's system | Yes |

PD writability information 901

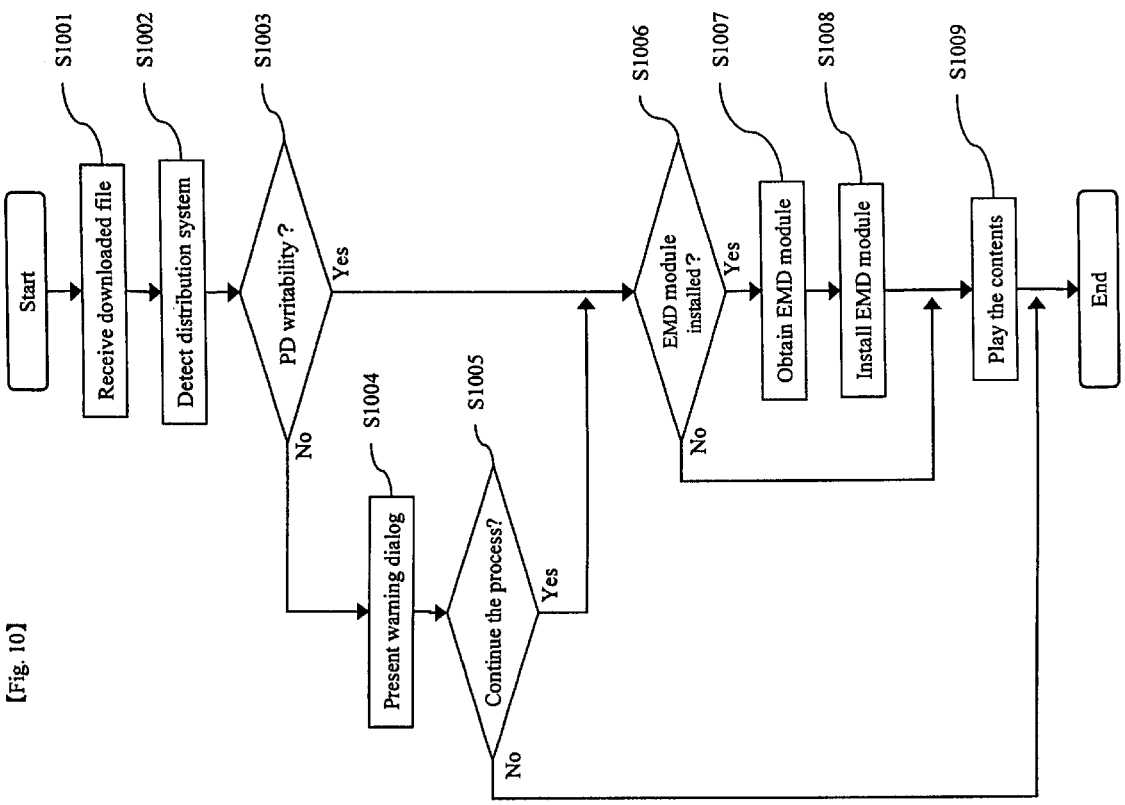
[Fig. 10]

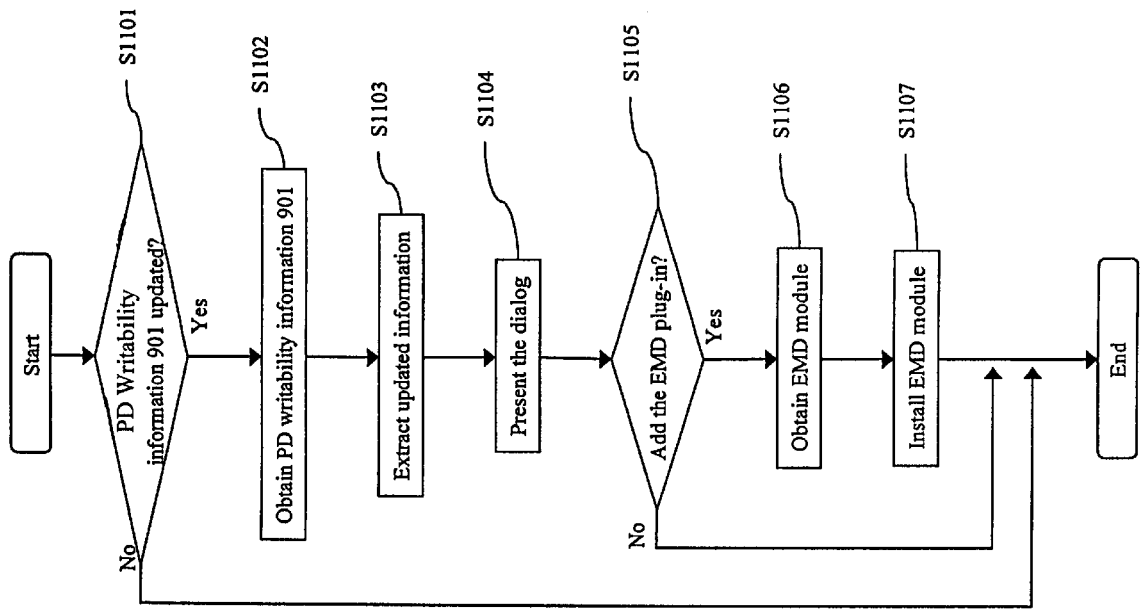
[Fig. 11]

SOFTWARE FUNCTION ADDING METHOD

BACKGROUND OF THE INVENTION

1) Field of the Invention

The present invention relates to a software for playing contents and writing contents onto an internal or external recording medium of a portable contents playing device.

2) Description of the Related Art

In recent years, fee-based distribution of music contents on the Internet, generally known as Electronic Music Distribution (EMD), has been becoming popular. There have been opened many sites that distribute such contents. Contents are distributed by various distribution systems depending on the EMD service providers. Therefore, a contents playing software that corresponds to each of these distribution systems is necessary in order to enjoy those contents on personal computers (PCs). Currently, a contents playing software 101 such as one shown in FIG. 1, which is designed to enable the contents distributed by various distribution systems to be handled with a single contents playing software, is commonly used. The contents playing software 101 is designed to execute management and playing of the contents distributed by various distribution systems via a plug-in (an add-on software that adds a new function to the existing software, hereinafter called "EMD plug-in"). In other words, by adding an EMD plug-in to the contents playing software 101, the contents distributed by various distribution systems can be handled by the contents playing software 101. For the convenience of consumers, the contents playing software 101 also has a function to automatically obtain and add to itself an EMD plug-in on the Internet as necessary. This function shall be hereinafter called "automatic EMD plug-in adding function."

Referring to the drawings, the structure and the operation of the contents playing software 101 is described below. The contents playing software 101 includes a controller 102, a distribution system detector 103, an EMD plug-in portion 104, and an EMD plug-in controller 105.

The controller 102 controls the distribution system detector 103, the EMD plug-in portion 104, and the EMD plug-in controller 105. The controller 102 also controls the entirety of the contents playing software 101. The controller 102 also receives various commands sent through an inputting means (not shown) such as a keyboard, and forwards the commands to each element as necessary.

The distribution system detector 103 checks the downloaded file to detect the distribution system of the contents.

The EMD plug-in, which is a plug-in for enabling the handling of the contents distributed by various systems, is installed into the EMD plug-in portion 104. FIG. 1 shows the EMD plug-in portion 104 having installed therein an EMD plug-in for Company A's system 106(a), which is a plug-in for enabling the handling of the contents distributed by Company A's system, and an EMD plug-in for Company B's system 106(b), which is a plug-in for enabling the handling of the contents distributed by Company B's system. The contents distributed by Company A's system, for example, is managed by the EMD plug-in for Company A's system 106(a). When a consumer desires to play this contents, the EMD plug-in for Company A's system 106(a) executes the processes for playing upon the command from the controller 102, thereby outputting music data from an output device (not shown) such as a speaker.

As shown in FIG. 2, the EMD plug-in controller 105 includes an EMD plug-in presence detector 201 and an EMD plug-in installer 202. Upon the commands from the plug-in controller 102, the EMD plug-in controller 105 executes the installation of the EMD plug-in into the EMD plug-in portion 104 and controls the installed EMD plug-in. The EMD plug-in presence detector 201 detects whether an EMD plug-in corresponding to the distribution system detected by the distribution system detector 103 is already installed in the EMD plug-in portion 104. This detection is executed by referring to an installed EMD plug-ins list 301 that lists installed EMD plug-ins with their versions as shown in FIG. 3. The EMD plug-in presence detector 201 and the EMD plug-in installer 202 share the installed EMD plug-ins list 301. If the EMD plug-in being sought is found not installed, the EMD plug-in presence detector 201 commands the EMD plug-in installer 202 to install the EMD plug-in. The EMD plug-in installer 202, upon receiving the command from the EMD plug-in presence detector 201, obtains the EMD plug-in from a site offering the EMD plug-in 108 and installs the EMD plug-in thus obtained into the EMD plug-in portion 104. At this time, the installed EMD plug-ins list 301 is updated. The EMD plug-in installer 202 retains information on sites offering EMD plug-ins 401, which lists the sites offering the EMD plug-ins for various distribution systems, along with their versions, as shown in FIG. 4. Based on this information, the site offering the EMD plug-in 108 is identified. The information on sites offering EMD plug-ins 401 is updated as appropriate and placed on a predetermined, designated server. The EMD plug-in installer 202 communicates with this server upon starting up the contents playing software 101, receiving the contents, or at any other proper timing. The EMD plug-in installer 202 obtains the information on sites offering EMD plug-ins 401 that is present on the server and newer than the information that the EMD plug-in installer 202 has. The aforesaid timing for obtaining information on sites offering EMD plug-ins 401 can be specified by the consumer on the contents playing software 101.

Referring to the flow chart shown in FIG. 5, the operation of the contents playing software 101 when a consumer tries to obtain the contents is explained below.

First in S501, when the consumer visits a contents distribution site 107 by using a general Web browser and tries to obtain the contents, the file containing either the contents itself or the information necessary for obtaining the contents is downloaded (which of the contents and the information is downloaded depends on the distribution system). This file is downloaded as a file having an extension predetermined by the distribution system. Such files having the extension are preset at the time of installing the contents playing software 101, so as to be automatically opened by the contents playing software 101 after the downloading. Such files contain the information regarding the distribution system to be used for the distribution of the contents. After the file is downloaded, the contents playing software 101 is automatically started. The controller 102 commands the distribution system detector 103 to detect the distribution system of the contents.

In S502, the distribution system detector 103 examines the downloaded file to detect the distribution system used for the contents distribution, and notifies the EMD plug-in presence detector 201 of the finding.

In S503, the EMD plug-in presence detector 201 refers to the installed EMD plug-ins list 301 and detects whether the EMD plug-in notified by the distribution system detector 103 is installed in the EMD plug-in portion 104. If it is determined in S503 that the EMD plug-in is installed, the EMD plug-in will not be added. The files downloaded in this way are processed later by the appropriate EMD plug-in, so that the consumer can enjoy the contents on the contents playing software 101 in S506 after purchasing processes are completed. If it is determined in S503 that the EMD plug-in is not yet installed, the EMD plug-in presence detector 201 commands the EMD plug-in installer 202 to install the necessary EMD plug-in.

In S504, the EMD plug-in installer 202 refers to the information on sites offering EMD plug-ins 401 to identify the site offering the EMD plug-in, and obtains the EMD plug-in from there.

In S505, the EMD plug-in installer 202 installs the EMD plug-in obtained in S504 into the EMD plug-in portion 104, and updates the installed EMD plug-ins list 301.

The files downloaded in this way are processed later by the appropriate EMD plug-in installed in S505, so that the consumer can enjoy the contents on the contents playing software 101 in S506 after the purchasing processes are completed.

This concludes the explanation of the contents playing software 101.

Thus, by using the contents playing software 101, the consumers can easily enjoy on their PCs contents distributed by various distribution systems.

Furthermore, portable devices (PDs) that allow use of the contents anywhere have begun to be introduced one after another. Such portable device writes on itself contents that has been downloaded onto the PC. By writing the contents onto a recording medium or the internal memory of the PD, the consumer can enjoy the contents wherever he is. The writing of the contents is carried out through a designated software, such as a commonly used contents playing software 601 shown in FIG. 6. The contents playing software 601 is constructed by combining the contents playing software 101 described earlier with an element for the function to write the contents on the PD. Other elements and the operation of the contents playing software 601 are similar to those of the contents playing software 101. Referring to the drawings, the structure and the operation of the contents playing software 601 are described below. The elements similar to those of the contents playing software 101 are given the identical reference numbers. Descriptions of such elements are omitted.

The contents playing software 601 includes a controller 102, a distribution system detector 103, an EMD plug-in portion 104, an EMD plug-in controller 105, and a PD plug-in portion 602. The difference from the contents playing software 101 is that the contents playing software 601 includes the PD plug-in portion 602. Into the PD plug-in portion 602, a PD plug-in, which is a plug-in that enables the contents to be written onto the PD, is installed. In FIG. 6, the PD plug-in portion 602 is shown having installed therein a PD plug-in for Company Q 603, which is a plug-in that enables the contents to be written on Company Q's PD 606.

In FIG. 6, the EMD plug-in portion 104 is shown having installed therein an EMD plug-in for Company A's system 604(*a*) which are the plug-ins constructed by adding a PD plug-in connector for Company Q 605 to the EMD plug-in for Company A's system 106(*a*) as described in FIG. 2 and also the EMD plug-in for Company B's system 106(*b*). Now, the PD plug-in connector for Company Q 605 is a means for converting the contents that is managed by the EMD plug-in into a data format for Company Q's PD 606, and also a means for securely transferring the converted data to the PD plug-in for Company Q 603. If the PD plug-in connector for Company Q 605 is not in the EMD plug-in, the contents managed by this EMD plug-in cannot be written onto Company Q's PD 606. This is because the data format of the contents written on the PD and the system for protecting the data at the time of transferring the data from the EMD plug-in to the PD plug-in vary depending on PD manufacturers. The EMD plug-in that does not have the PD plug-in connector for Company Q 605 cannot convert the contents it manages into data format for Company Q's PD 606, or securely transfer the data to the PD plug-in for Company Q 603.

For example, in a case shown in FIG. 6, the contents distributed by Company A's distribution system can be written on to Company Q's PD 606. However, the contents distributed by Company B's distribution system cannot be written onto Company Q's PD 606.

Generally, each PD is sold bundled with a software for writing the contents onto the PD. When the bundled software is a contents playing software having a structure like that of FIG. 6 as explained in Description of the Related Art, and when the consumer has installed the contents playing software onto the PC, the PD plug-in that enables the contents to be written onto the PD he has purchased is installed into the PD plug-in portion 602. At the same time, the EMD plug-in that enables the contents to be transferred to this PD plug-in is installed into the EMD plug-in portion 104.

Now, suppose that a consumer who has installed a piece of contents playing software visits a contents distribution site and tries to obtain the contents that is distributed based on a distribution system with which the EMD plug-in installed in the contents playing software is not compatible. In this case, the aforesaid automatic EMD plug-in adding function is activated. The necessary EMD plug-in is automatically added onto the contents playing software, so that the consumer can enjoy the contents on the contents playing software after the purchasing processes are completed.

However, the contents managed by the EMD plug-in thus added may not always be able to be written onto a PD purchased by the consumer. If this is the case, the consumer ends up being unable to write the contents onto the PD even after the purchasing processes are completed. In such cases, it is very likely that complaints are sent to the distributor of the PD.

SUMMARY OF THE INVENTION

The present invention was devised in view of such situations. A principal object of the present invention is to provide a system that warns that the contents cannot be written onto the PD when a consumer tries to purchase the contents that cannot be written on the PD, thereby preventing complaints that may otherwise be sent to the distributor of the PD.

BRIEF DESCRIPTION OF THE DRAWINGS

FIG. 1 is a block diagram showing contents playing software in accordance with the conventional art.

FIG. 2 is a block diagram showing the structure of an EMD plug-in controller.

FIG. 3 shows an example of an installed plug-ins list.

FIG. 4 shows an example of information on sites offering EMD plug-ins.

FIG. 5 is a flow chart showing the operation of contents playing software in accordance with the conventional art.

FIG. 6 is a block diagram showing the structure of contents playing software in accordance with the conventional art.

FIG. 7 is a block diagram showing the structure of contents playing software in accordance with the first embodiment of the present invention.

FIG. 8 is a block diagram showing the structure of an EMD plug-in controller 702.

FIG. 9 is a block diagram showing an example of PD writability information.

FIG. 10 is a flow chart showing the operation of contents playing software in accordance with the first embodiment of the present invention.

FIG. 11 is a flow chart showing the operation of contents playing software in accordance with the second embodiment of the present invention.

DESCRIPTION OF THE PREFERRED EMBODIMENTS

Referring to the drawings, embodiments of the present invention are described below.
(First Embodiment)

The contents playing software in accordance with the first embodiment of the present invention is described below. FIG. 7 is a block diagram showing the structure of contents playing software in accordance with the first embodiment of the present invention. Referring to FIGS. 7–10, the structure and the operation of a contents playing software 701 in accordance with the first embodiment of the present invention are described below. The elements that are similar to those of the contents playing software 601 described in Description of the Related Art are given the identical reference numbers. Descriptions of such elements are omitted.

A contents playing software 701 includes a controller 102, a distribution system detector 103, an EMD plug-in portion 104, an EMD plug-in controller 702, and a PD plug-in portion 602. The contents playing software 701 in accordance with the first embodiment of the present invention is a software for writing contents onto Company Q's PD. The EMD plug-in for Company A's system 604(a) described in the Description of the Related Art is installed in the EMD plug-in portion 104. The PD plug-in for Company Q 603 is installed in the PD plug-in portion 602.

The difference between the contents playing software 701 and the contents playing software 601 is the structural deference between the EMD plug-in controller 702 and the EMD plug-in controller 105 as shown in FIG. 8. Other elements and operation of the contents playing software 701 are similar to those of the contents playing software 601.

In FIG. 8, the EMD plug-in controller 702 comprises the EMD plug-in presence detector 201, the EMD plug-in installer 202, and the PD writability detector 801. The EMD plug-in controller 702 is different from the EMD plug-in controller 105 is that the EMD plug-in controller 702 has the PD writability detector 801. The PD writability detector 801 has PD designation information 802, which is the information indicating which PDs the contents playing software player 701 is designed to write the contents in. The PD writability detector 801 is a means for determining whether the contents distributed by the distribution system detected by the distribution system detector 103 can be written onto the PD indicated by the PD designation information 802. The PD writability detector 801 has PD writability information 901 that shows whether the contents distributed by various distribution systems can be written onto the PD. The aforesaid determination is done based on this information. The PD writability information 901, which is retained by the PD writability detector 801, is information regarding the PDs that are shown in the PD designation information 802.

For example, in the first embodiment of the present invention, the contents playing software 701 is the software for writing the contents onto Company Q's PD 606. Therefore, the PD designation information 802 says "Company Q's PDs," indicating that the PD writability information 901 held by the PD writability detector 801 is for Company Q's PDs. The PD designation information 802 also indicates whether the contents distributed by various distribution systems can be written on Company Q's PD 606. The PD writability information 901 is updated as appropriate and is placed on a predetermined, designated server. The PD writability detector 801 communicates with this server upon starting up the contents playing software 701, upon receiving the contents, or at any other proper time, so as to obtain the PD writability information 901 on the server which is newer than the information it has. The timing for obtaining the PD writability information 901 can be specified by the consumer on the contents playing software 701.

Referring to the flow chart shown in FIG. 10, a warning function that is activated when a consumer tries to obtain the contents that cannot be written on the PD is explained below.

First, in S1001, when a consumer visits a contents distribution site 107 using a general Web browser and tries to obtain the contents, the file containing either the contents itself or the information necessary for obtaining the contents is downloaded (which of the contents and the information is downloaded depends on the distribution system). This file is downloaded as a file having an extension predetermined by the distribution system. Such files having the extension are preset at the time of installing the contents playing software 101, such that the files are automatically opened by the contents playing software 101 after the downloading. Such files contain the information on the distribution system to be used for the distribution of the contents. After the file is downloaded, the contents playing software 101 automatically starts up, and the controller 102 commands the distribution system detector 103 to detect the contents distribution system.

In S1002, the distribution system detector 103 examines the downloaded file to detect the distribution system used for the contents, and notify the PD writability detector 801 of the finding.

In S1003, the PD writability detector 801 refers to the PD writability information 901 and detects whether the contents distributed by the distribution system notified by the distribution system detector 103 is capable of being written onto the PD. If it is determined in S1003 that the contents can be written, the PD writability detector 801 will not do anything, and proceed to S1005. If it is determined in S1003 that the contents cannot be written, the PD writability detector 801 requests the controller 102 to warn the consumer.

In S1004, the controller 102 warns the consumer through an information presentation area (not shown) such as a monitor that the contents he is trying to obtain cannot be written on the PD even after purchasing processes are completed. Then, the controller 102 shows a dialogue for asking whether he wishes to continue the process. The consumer gives a command regarding whether to continue or discontinue the process through the inputting means (not shown) such as a keyboard.

In S1005, the controller 102 receives the command from the consumer given through the inputting means. If the command received in S1005 is to discontinue the process, the process will be terminated. If the command received in S1005 is to continue the process, the controller 102 commands each element to continue the processes of and after S1006.

In S1006, the EMD plug-in presence detector 201 detects whether the EMD plug-in corresponding to the distribution system determined by the distribution system detector 103 in S1002 is installed in the EMD plug-in portion 104. If it is determined in S1006 that the EMD plug-in has been installed, the EMD plug-in will not be added. The files downloaded in this way are processed later by the appropriate EMD plug-in, so that the consumer can enjoy the contents on the contents playing software 701 in S1009 after the purchasing processes are completed. If it is determined that the EMD plug-in has yet to be installed in S1006, the EMD plug-in presence detector 201 commands the EMD plug-in installer 202 to install the necessary EMD plug-in.

In S1007, the EMD plug-in installer 202 refers to the information on sites offering EMD plug-ins 401 shown in FIG. 4 to identify the site offering the EMD plug-in, and obtains the EMD plug-in from there.

In S1008, the EMD plug-in installer 202 installs the EMD plug-in obtained in S1007 into the EMD plug-in portion 104.

The files downloaded in this way are processed later by the appropriate EMD plug-in installed in S1008, so that the consumer can enjoy the contents on the contents playing software 701 in S1009 after the purchasing processes are completed.

As described above, with the contents playing software in accordance with the first embodiment of the present invention, it is possible to pre-warn the consumer who is trying to obtain contents that cannot be written on the PD.

The above description has been made for a case in which the contents playing software 701 operates on a PC. However, this should not be construed as limitations on the scope of the invention. The contents playing software 701 may operate on mobile phones or set-top boxes (STB's).

In the above description, the distribution of the contents is conducted via the Internet. However, this should not be construed as limitations on the scope of the invention. It may be conducted via satellite broadcast, cable TV, or the like.

This concludes the description of the first embodiment.
(Second Embodiment)

The contents playing software in accordance with the second embodiment of the present invention is described below. The contents playing software in accordance with the second embodiment has a structure similar to that of the contents playing software 701 of the first embodiment. Its difference from the contents playing software 701 of the first embodiment is that the contents playing software of the second embodiment has a function to notify the consumer that contents distributed by a certain distribution system has newly become available for writing onto the PD. Further, the contents playing software of the second embodiment automatically installs the EMD plug-in for that distribution system into the EMD plug-in portion 104 if the consumer so desires.

Referring to the flow chart in FIG. 11, the operation of this function is described below.

In S1101, the PD writability detector 801 communicates with the designated server on which the PD writability information 901 is placed, to determine whether there is PD writability information 901 on the server that is newer than the PD writability information 901 that the PD writability detector 801 has. This is determined by comparing version numbers of each of the PD writability informations 901. If it is determined in S1101 that there is no newer PD writability information 901, the aforesaid function will not operate. Accordingly, the process will be terminated. If it is determined in S1101 that there is newer PD writability information 901, the PD writability detector 801 obtains in S1102 the newer PD writability information 901 from the server.

In S1103, the PD writability detector 801 compares the PD writability information 901 that it had, to identify the distribution system that has become newly available for writing the contents on the PD. The finding is transferred to the controller 102. Then, the PD writability information 901 that has been retained is discarded.

In S1104, the controller 102 notifies the consumer through the information presentation area (not shown) such as a monitor that there is a distribution system that has become available for writing the contents onto the PD. Then, the controller 102 shows a dialogue for asking whether to add the EMD plug-in for that distribution system. The consumer gives a command regarding whether or not to add the EMD plug-in through the inputting means (not shown) such as a keyboard.

In S1105, the controller 102 receives the command from the consumer given through the inputting means. If the command received in S1105 is not to add the EMD plug-in, the process will be terminated. If the command received in S1105 is to add the EMD plug-in, the controller 102 directs each element to continue the processes of and after S1106.

In S1106, the EMD plug-in installer 202 refers to the information on sites offering EMD plug-ins 401 shown in FIG. 4. Then, the EMD plug-in installer 202 identifies the site from which an EMD plug-in for the distribution system that has become available for writing contents on the PD can be obtained. Thereafter, the EMD plug-in installer 202 obtains the EMD plug-in.

In S1107, the EMD plug-in installer 202 installs the EMD plug-in obtained in Step S1007 into the EMD plug-in portion 104. There may be an older version of the EMD plug-in already installed in the EMD plug-in portion 104 which does not allow the contents to be written on the PD. If this is the case, the EMD plug-in installer 202 first removes the old EMD plug-in which is already installed, and then installs the EMD plug-in newly obtained.

As described so far, with the contents playing software in accordance with the second embodiment of the present invention, it is possible for the consumer to promptly know that the contents distributed by a certain distribution system has become newly available for writing contents on a PD, and also to easily install the EMD plug-in for that distribution system.

This concludes the description of the second embodiment.

As explained above, with the present invention, it is possible to pre-warn the consumer who is trying to purchase contents that cannot be written on the PD, thus reducing complaints that may be sent to the distributor of the PD and relieving the burden upon the PD distributor.

What is claimed is:

1. A contents playing software for playing contents and writing contents on an internal or external recording medium of portable contents playing devices, said contents playing software comprising:

a contents management/playing portion having one or more managing/playing contents means;

a contents writing portion having one or more contents writing means for writing the contents on the internal or external recording medium of the portable contents playing devices; and a basic function portion for controlling said contents management/playing portion, said contents writing portion, and an entirety of said contents playing software, said contents managing/playing means each managing and playing the contents distributed by a specific distribution system, said contents writing means each writing the contents on an internal or external recording medium of a specific portable contents playing device, said contents managing/playing means being capable of having transferring means for transferring the contents to said contents writing means, said contents writing means receiving the contents only from said contents management/playing means that has said transferring means for transferring the contents, said contents writing means writing the contents thus received on the internal or external recording medium of the portable contents playing devices;

said basic function portion including
distribution system detecting means for detecting the distribution system of the contents which a user of said contents playing software is trying to obtain, and contents management/playing means-adding means for adding said contents management/playing means to said contents management/playing portion;

said contents management/playing means-adding means including contents management/playing means-automatic adding means for obtaining from an external source said contents management/playing means for the distribution system detected by said distribution system detection means and automatically adding said contents management/playing means if said contents managing/playing portion does not have said contents management/playing means, said contents management/playing means-adding means further including portable contents playing device designation information that indicates portable contents playing devices whose internal or external recording medium said contents playing software writes the contents in, and contents transferability information that includes information indicating distribution systems whose contents management/playing means has said transferring means that transfers the contents to said contents writing means of the portable contents playing devices indicated in said portable contents playing device designation information, said contents management/playing means-adding means determining, based on said contents transferability information, whether said contents management/playing means for the distribution system detected by said distribution system detection means has said contents transferring means, and if said contents management/playing means does not have said contents transferring means, said contents management/playing means-adding means warning to the user of the contents playing software that the contents he is trying to obtain cannot be written on the internal or external recording medium of the portable contents playing devices indicated in said portable contents playing device designation information, and stopping an execution of an automatic adding function of said contents managing/playing means or confirming with the user of said contents playing software whether or not to execute the automatic adding function of said contents managing/playing means.

2. The contents playing software in accordance with claim 1, wherein said contents transferability information is updated as appropriate and is placed in a designated external server; and said contents management/playing means-adding means communicates with the designated server at a proper time, obtains said contents transferability information if there is said contents transferability information on the designated server that is newer than said contents transferability information that said contents management/playing means-adding means has, and updates said contents transferability information that said contents management/playing means-adding means has.

3. The contents playing software in accordance with claim 2, wherein said basic function portion has timing setting means for allowing the user of the contents playing software to freely set the timing at which said contents management/playing means-adding means communicates with the designated server.

4. The contents playing software in accordance with claim 3, wherein said contents management/playing means-adding means identifies, at the time of updating said contents transferability information that said contents management/playing means-adding means has, a distribution system whose contents management/playing means has newly obtained said contents transferring means, and notifies the user of the contents playing software that the contents distributed by the distribution system thus identified can newly be written on the internal or external recording medium of the portable contents playing devices indicated in said portable contents playing device designation information.

5. The contents playing software in accordance with claim 4, wherein said contents management/playing means-adding means identifies, at the time of updating the contents transferability information that said contents management/playing means-adding means has, a distribution system whose contents management/playing means has newly obtained said contents transferring means, and executes said automatic adding function of said contents managing/playing means, thereby adding said contents management/playing means thus identified to said contents management/playing portion.

6. The contents playing software in accordance with claim 2, wherein said contents management/playing means-adding means identifies, at the time of updating said contents transferability information that said contents management/playing means-adding means has, a distribution system whose contents management/playing means has newly obtained said contents transferring means, and notifies the user of the contents playing software that the contents distributed by the distribution system thus identified can newly be written on the internal or external recording medium of the portable contents playing devices indicated in said portable contents playing device designation information.

7. The contents playing software in accordance with claim 6, wherein said contents management/playing means-adding means identifies, at the time of updating the contents transferability information that said contents management/playing means-adding means has, a distribution system whose contents management/playing means has newly obtained said contents transferring means, and executes said automatic adding function of said contents managing/playing means, thereby adding said contents management/playing means thus identified to said contents management/playing portion.

* * * * *

UNITED STATES PATENT AND TRADEMARK OFFICE
CERTIFICATE OF CORRECTION

PATENT NO.     : 6,336,028 B1                                             Page 1 of 1
DATED          : January 1, 2002
INVENTOR(S)    : Ryuichi Okamoto et al.

It is certified that error appears in the above-identified patent and that said Letters Patent is hereby corrected as shown below:

Column 10,
Lines 16-17, replace "claim 3" with -- claim 2 --
Lines 30-31, replace "claim 4" with -- claim 3 --
Lines 42-43, replace "claim 2" with -- claim 4 --
Lines 56-67, replace "claim 6" with -- claim 5 --

Signed and Sealed this

Eighteenth Day of June, 2002

*Attest:*

JAMES E. ROGAN
*Attesting Officer*  *Director of the United States Patent and Trademark Office*